United States Patent
Reese et al.

(10) Patent No.: US 9,819,787 B2
(45) Date of Patent: Nov. 14, 2017

(54) MOBILE DEVICE INHIBITOR

(71) Applicant: AT&T Intellectual Property I, L.P., Atlanta, GA (US)

(72) Inventors: Kevin Reese, Fayetteville, GA (US); Alfonso Jones, Irving, TX (US); Steven L. McDonald, Locust Grove, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 70 days.

(21) Appl. No.: 14/451,739

(22) Filed: Aug. 5, 2014

(65) Prior Publication Data

US 2016/0044155 A1 Feb. 11, 2016

(51) Int. Cl.
*H04M 3/00* (2006.01)
*H04M 1/725* (2006.01)

(52) U.S. Cl.
CPC .... *H04M 1/72577* (2013.01); *H04M 1/72572* (2013.01); *H04M 2250/10* (2013.01); *H04M 2250/12* (2013.01)

(58) Field of Classification Search
CPC ...................... H04M 1/72577; H04M 1/72572
USPC ........................................................ 455/418
See application file for complete search history.

(56) References Cited

U.S. PATENT DOCUMENTS

| | | | |
|---|---|---|---|
| 7,006,793 B2 | 2/2006 | Himmel et al. | |
| 7,876,205 B2 | 1/2011 | Catten et al. | |
| 8,213,962 B2 | 7/2012 | Carr | |
| 8,290,480 B2 | 10/2012 | Abramson et al. | |
| 8,295,890 B2 | 10/2012 | Mendenhall et al. | |
| 8,315,617 B2 | 11/2012 | Tadayon et al. | |
| 8,527,013 B2 | 9/2013 | Guba et al. | |
| 8,634,826 B1* | 1/2014 | Cope | H04W 8/22 370/328 |
| 9,185,526 B2* | 11/2015 | Guba | G08G 1/20 |
| 2002/0198005 A1 | 12/2002 | Hilton et al. | |
| 2004/0214615 A1 | 10/2004 | Entenmann et al. | |
| 2010/0080366 A1* | 4/2010 | Anglin | H04M 1/6505 379/88.22 |
| 2010/0210254 A1 | 8/2010 | Kelly et al. | |
| 2012/0021717 A1 | 1/2012 | Schmidt | |
| 2012/0115413 A1 | 5/2012 | Czaja et al. | |
| 2012/0252350 A1 | 10/2012 | Steinmetz et al. | |
| 2013/0035063 A1* | 2/2013 | Fisk | H04M 1/72572 455/410 |
| 2013/0035117 A1 | 2/2013 | Litkouhi et al. | |

(Continued)

*Primary Examiner* — Martin Mushambo
(74) *Attorney, Agent, or Firm* — Amin, Turocy & Watson, LLP

(57) ABSTRACT

To block calls and other mobile device network activities in a vehicle while the vehicle is being operated, a vehicle cellphone inhibitor system is provided. A femtocell device can be provided to reroute communications between a cellular network and the mobile device through the femtocell device. The vehicle cellphone inhibitor system can selectively block calls or other network operations on the mobile device that are routed through the femtocell device on the mobile device while leaving the mobile device otherwise operational. The blocking can be activated whenever the vehicle is moving, which can be determined via GPS, accelerometers, or a connection via the vehicle's electronic control unit ("ECU") utilizing vehicle data to determine whether the vehicle is in motion or being operated.

20 Claims, 10 Drawing Sheets

(56) References Cited

U.S. PATENT DOCUMENTS

2013/0078963 A1     3/2013   Prasad et al.
2014/0155052 A1     6/2014   Glover

* cited by examiner

MOBILE DEVICE INHIBITOR

TECHNICAL FIELD

The subject disclosure relates to a mobile device inhibitor, and, for example, to blocking operation of a mobile device while in a vehicle being operated.

BACKGROUND

Talking on, texting, surfing the internet, or operating, a mobile device while driving greatly increases safety risks involved with driving. A number of states and localities have enacted laws that make it a crime to use a phone without a hands free device such as ear buds or an ear piece. Apart from these laws however, vehicle fleet managers and other consumers such as parents can set up even more restrictive protocols for mobile device operations while driving. Vehicle fleet managers may limit all use of mobile devices while employees are operating the vehicles. Likewise, parents may restrict their children from talking on their cell phones while driving.

DETAILED DESCRIPTION

Figure 1:
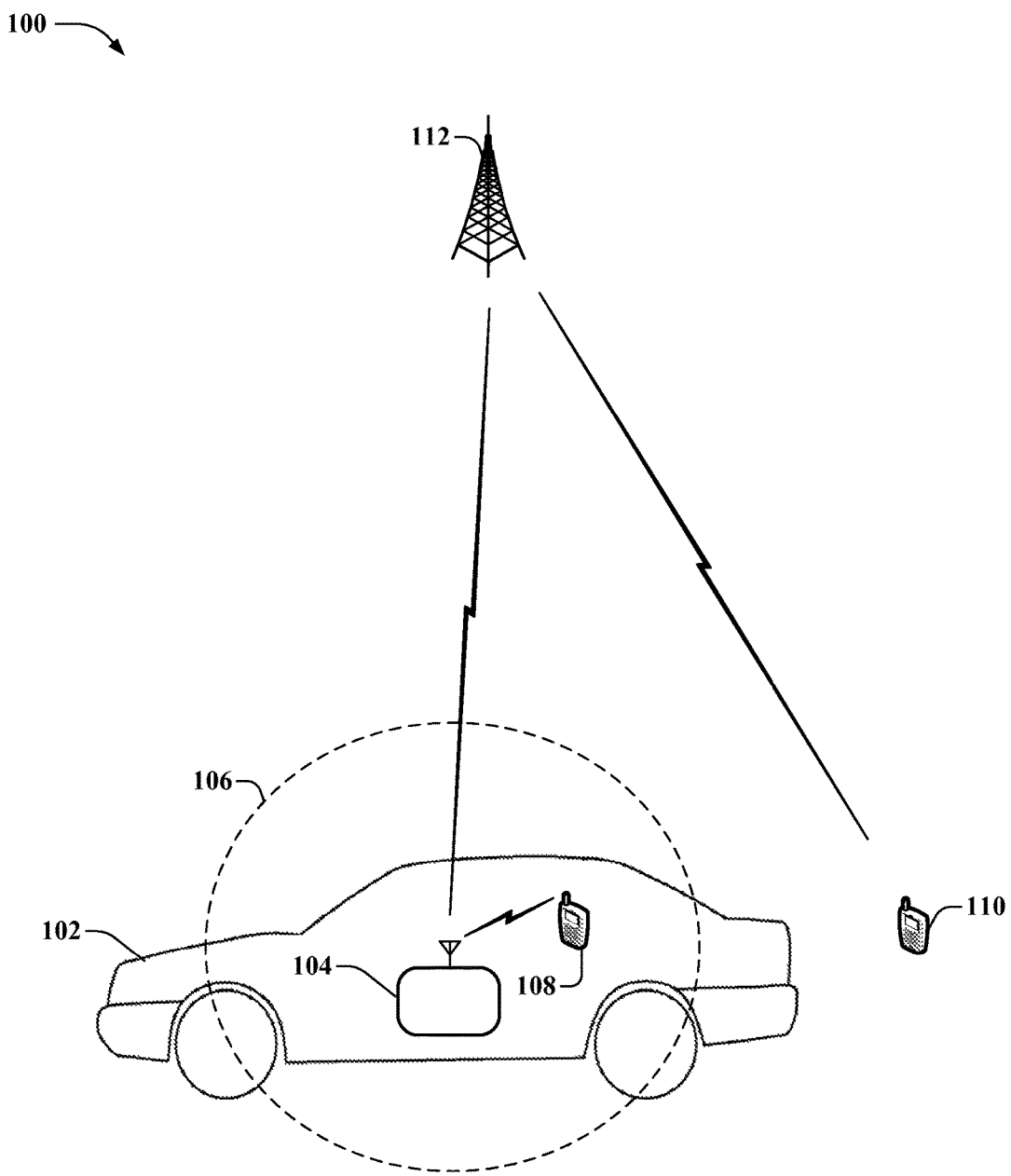
FIG. 1 is an example, non-limiting embodiment of a block diagram showing a mobile device inhibitor system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To block calls and other mobile device functions in a vehicle while the vehicle is being operated, a vehicle cellphone inhibitor system is provided. A femtocell device can be provided to reroute communications between a cellular network and the mobile device through the femtocell device. The vehicle cellphone inhibitor system can selectively block calls or other network operations on the mobile device that are routed through the femtocell device on the mobile device while leaving the mobile device otherwise operational. The blocking can be activated whenever the vehicle is moving, which can be determined via GPS, accelerometers, or a connection via the vehicle's electronic control unit ("ECU").

In an embodiment, the system can learn which mobile devices to block based on the owner of the mobile device, location of the mobile device, how long the mobile device is within range of the femtocell device and operational history of the mobile device. The system can also allow 911 and other emergency calls to be made while blocking other calls. In some embodiments, calls to and from specific numbers/users can be whitelisted and/or otherwise allowed to go through.

In an embodiment, the mobile device inhibitor system can be a device that can be hardwired, or otherwise permanently coupled to the vehicle, either in the cabin, or under the hood of the vehicle. In other embodiments, the device can be sized such that it can fit in the palm of a hand and/or can be directly plugged into the vehicle diagnostic port or be integrated within the vehicles "intelligent vehicle device" (IVD). In an embodiment the device can contain a SIM chip that allows the device to be remotely monitored and/or configured. In an embodiment, the device can draw power from the diagnostic port or other in vehicle power supply, and in other embodiments, the device can contain batteries that power the device.

For these considerations as well as other considerations, in one or more embodiments, a system includes a processor and a memory that stores executable instructions that when executed by the processor, facilitate performance of operations, including determining that a mobile device is within range of a femtocell device that is associated with a vehicle. The operations can also include initiating routing of a communication between the mobile device and a network device of a cellular network via the femtocell device. The operations can further include inhibiting a network operation of the mobile device in response to determining that the network operation is to be blocked based on an operational status of the vehicle.

In another embodiment, a method includes determining, by a device comprising a processor, that a network operation of a mobile device within range of a femtocell device is to be rerouted via the femtocell device. The method can also include facilitating, by the device, routing of a communication between the mobile device and a cellular network device via the femtocell device and determining, by the device, that the network operation of the mobile device is to be inhibited based on an activity of a vehicle in which the vehicle is determined to be engaged, wherein the vehicle is configured to couple to the femtocell device. The method can further include blocking, by the device, call functionality and data usage of the mobile device in response to determining that the network operation of the mobile device is to be inhibited.

In another embodiment, a femtocell device can include a processor and a memory that stores executable instructions that, when executed by the processor, facilitate performance of operations. The operations can include routing a communication between a network device of a cellular network and a mobile device, wherein the femtocell device is associated with a vehicle. The operations can further include determining that a network operation of the mobile device is to be blocked in response to determining that the vehicle is moving and the femtocell device receiving an indication to block the communications between the network device and the mobile device.

Turning now to FIG. 1, illustrated is an example, non-limiting embodiment of a block diagram 100 showing a mobile device inhibitor system 104 on vehicle 102. Mobile device inhibitor system 104 can block phone calls on mobile device 108 when the vehicle 102 is moving and/or otherwise being operated. Mobile device inhibitor system 104 can include a femtocell device (shown in more detail in FIGS. 5 and 6) that reroutes communications between an antenna 112 and the mobile device 108 through the femtocell device in mobile device inhibitor system 104. The mobile device inhibitor system 104 can selectively block calls or other network operations on the mobile device 104 that are routed through the mobile device inhibitor system 104 while leaving the mobile device 108 otherwise operational.

In an embodiment, mobile device inhibitor system 104 can selectively inhibit mobile devices. For example, mobile device inhibitor system 104 can inhibit and/or otherwise control communications on mobile device 108 and not control mobile device 110 which can be in direct communication with the mobile network via antenna 112. Mobile device inhibitor system 104 can determine whether to inhibit and/or otherwise manage network operations on mobile devices 104 and 108 based on whether or not the mobile devices 104 and 108 are within the range 106 of mobile device inhibitor system 104. In other embodiments, mobile device inhibitor system 104 can determine whether to inhibit the mobile devices 104 and 108 based on other factors, including but not limited to: length of time that the mobile devices are within range 106, network operations of the mobile devices, the user associated with the mobile devices, and others.

In an embodiment, the mobile device inhibitor system 104 determines whether communications and other network operations between the mobile device 108 and antenna 112 should be managed or otherwise rerouted through the mobile device inhibitor system 104. All communications, (e.g., phone calls, text messages, data operations, etc.) between the mobile device 108 and the mobile network can be routed through the mobile device inhibitor system 104. Upon determining that the network operations should be inhibited, the mobile device inhibitor system 104 can block or otherwise prevent communications from being sent between the mobile device 108 and the mobile network.

In an embodiment, the femtocell device on mobile device inhibitor system 104 can receive a network connection from the same macrocell device (not pictured) connected to antenna 112 that mobile device 110 communicates with, or the femtocell device can use a separate communication system.

Figure 2:
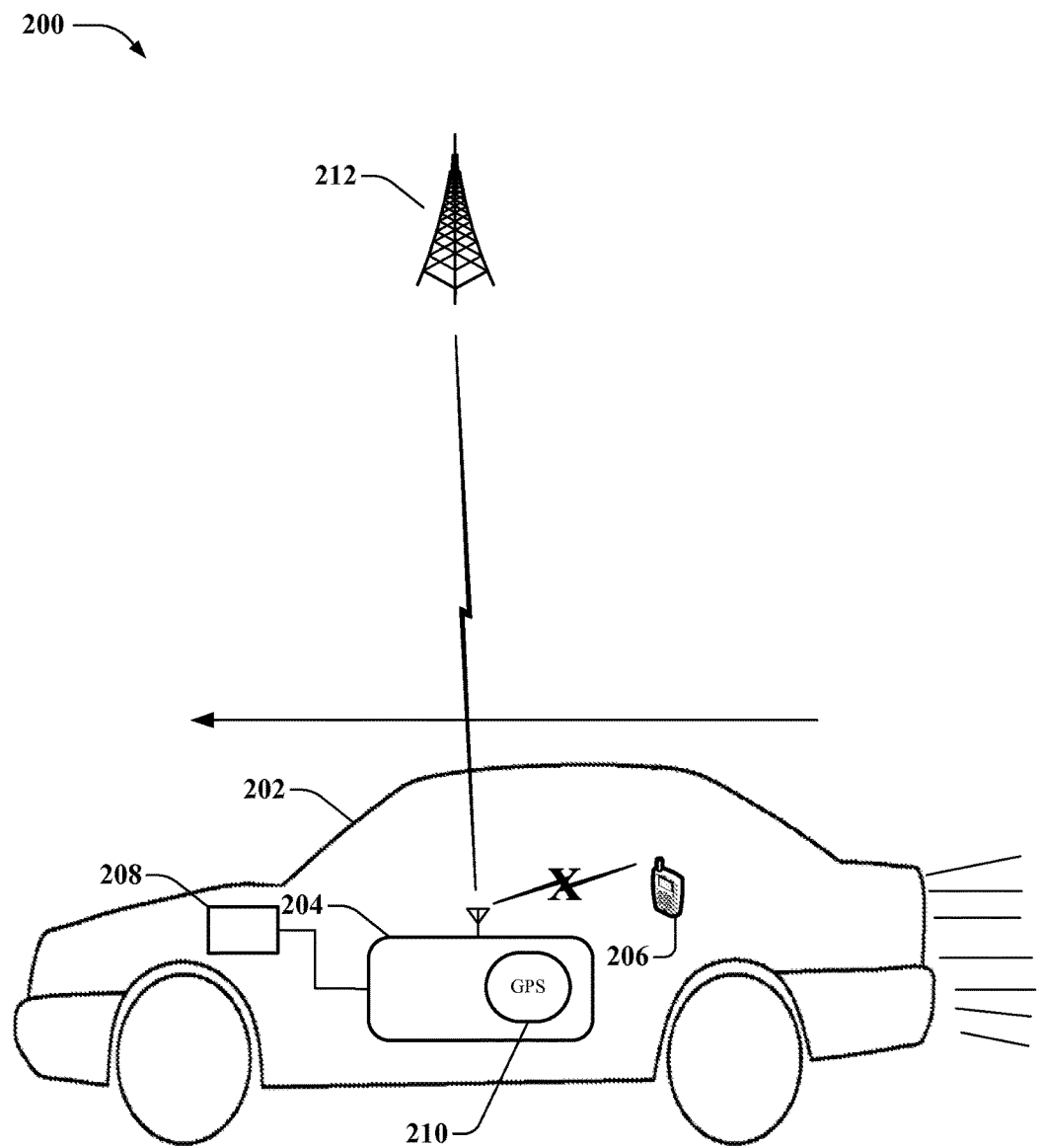
FIG. 2 is an example, non-limiting embodiment of a block diagram showing a mobile device inhibitor system that blocks calls in accordance with various aspects described herein.

Turning now to FIG. 2, illustrated is an example, non-limiting embodiment of a block diagram 200 showing a mobile device inhibitor system 204 that blocks calls and/or other network operations such as text messages, and data transfer operations on mobile device 206.

Mobile device inhibitor system 204 can block the network operations on mobile device 206 when the vehicle 202 is determined to be moving and/or otherwise under operation. Mobile device inhibitor system 204 can route communications to and from the mobile device 206 and antenna 212 via a femtocell device on mobile device inhibitor system 204 (shown in more detail in FIG. 5).

In an embodiment, calls and other data usage on the mobile device 206 can thus pass through mobile device inhibitor system 204 until mobile device inhibitor system 204 determines to inhibit the calls and data usage. In other embodiments, mobile device 206 can be in direct communication with antenna 212, and can reroute the communications through mobile device inhibitor system 204 when mobile device inhibitor system 204 determines that the network operations are to be inhibited.

In an embodiment, mobile device inhibitor system 204 can determine to inhibit the network operations on the mobile device 206 when the vehicle 202 is determined to be moving and/or otherwise under operation. In an embodiment, mobile device inhibitor system 204 can determine the vehicle 202 is moving based on data received from the vehicle's electronic control unit (ECU). The mobile device inhibitor system 204 can be plugged into an ECU port, or other port on the vehicle 202 (e.g., an onboard diagnostics port or other existing connection). The mobile device inhibitor system 204 can also be connected wirelessly to the ECU. The data received via the ECU port can include data about engine RPMs (revolutions per minute) and/or ignition status (on/off). In other embodiments, the mobile device inhibitor system 204 can determine the vehicle 202 is moving based on accelerometers located in or near the mobile device inhibitor system 204. In still other embodiments, the mobile device inhibitor system 204 can determine the vehicle 202 is moving based on a global positioning system 210 located in the mobile device inhibitor system 204. In an embodiment, the network operations can then be unblocked when the vehicle is determined to come to a stop or when the engine is turned off.

In an embodiment, mobile device inhibitor system 204 can inhibit and/or otherwise block network operations whenever the vehicle 202 is being operated, regardless of whether the vehicle 202 is moving. Thus, network operations would be inhibited while the vehicle 202 is stopped at a traffic light. Since a driver should still pay attention to traffic and their surroundings at a traffic light and other temporary stops, the mobile device inhibitor system 204 can block calls and network operations even when the vehicle is not moving.

Whether or not the mobile device inhibitor system 204 inhibits calls based on the vehicle movement or on whether the vehicle is turned on or otherwise has the engine running, can be based on a setting selected by a fleet manager or operator of the mobile device inhibitor system 204. The setting can be controlled remotely by the fleet manager or operator (e.g., parents, vehicle owners, etc). In other embodiments, the setting can be based on the time of day, day of the week, or other predetermined factors. These remote operations to the inhibitor can be controlled, modified, changed, etc. Over-The-Air (OTA) by remote APIs (Application Programming Interface) to the inhibitor that can be accessed via a website interface.

Figure 3:
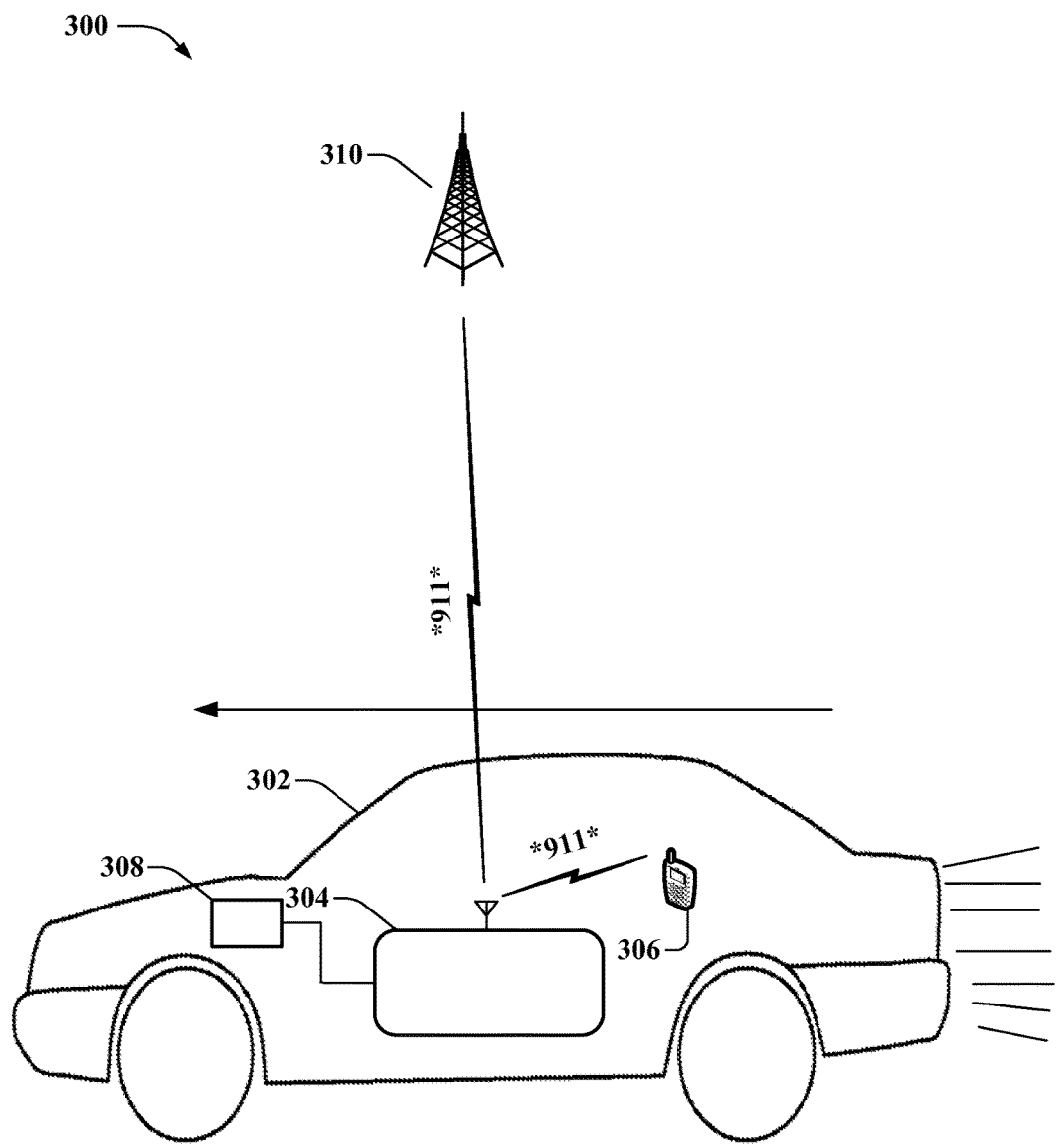
FIG. 3 is an example, non-limiting embodiment of a block diagram showing a mobile device inhibitor system that allows emergency calls in accordance with various aspects described herein.

Turning now to FIG. 3. Illustrated is an example, non-limiting embodiment of a block diagram 300 showing a mobile device inhibitor system 304 that allows emergency calls. Mobile device inhibitor system 304 can block calls from mobile device 306 when the vehicle 302 is moving, but allow calls to be placed through to the mobile network when it is determined that the phone call is an emergency call.

Figure 5:
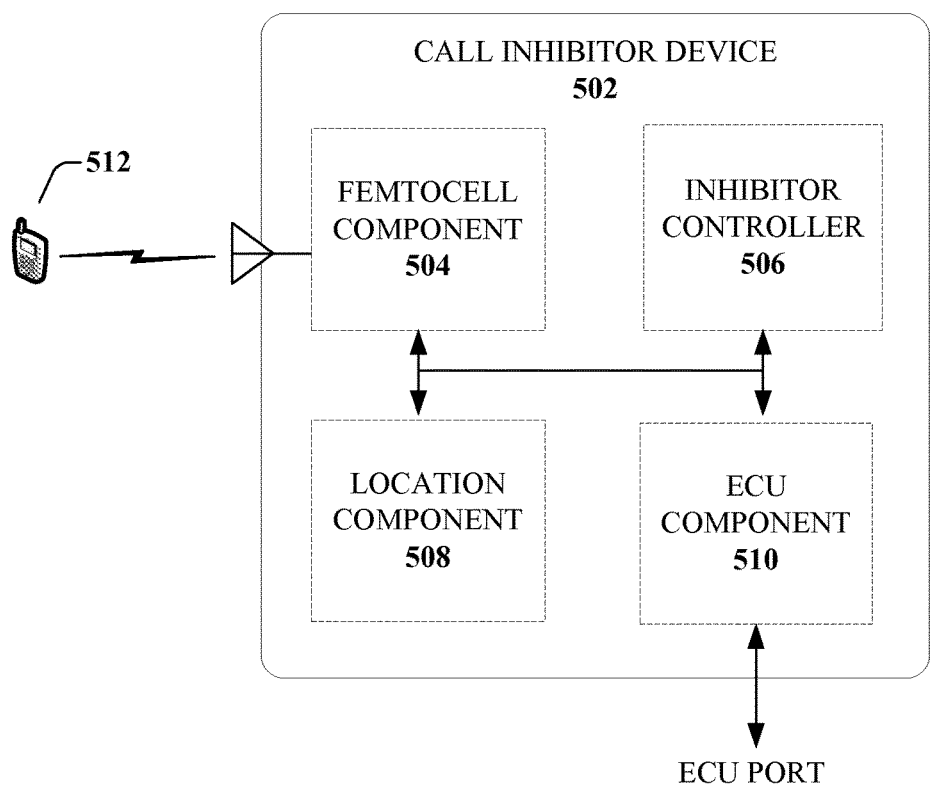
FIG. 5 is an example, non-limiting embodiment of a block diagram showing a mobile device inhibitor system in accordance with various aspects described herein.

In an embodiment, mobile device inhibitor system 304 blocks the phone calls on mobile device 306 when the vehicle 302 is moving by routing communications between the mobile device 306 and the antenna 308 through a femtocell device in the mobile device inhibitor system 304 (shown in more detail in FIG. 5). Normal operations and/or data usage on the mobile device 306 can be blocked and/or otherwise inhibited when the vehicle is moving, but when an outgoing call, incoming call, or data usage determined to be emergency related is made, the mobile device inhibitor system 304 can allow the call to go through, or the data usage to continue. Examples of emergency calls can include 911 calls and calls to or from a dispatcher or other emergency service. Data usage connected with applications that are associated with emergency services can also be allowed to pass through mobile device inhibitor system 304. In an embodiment, any phone calls to or from a white-listed number, or data usage associated with approved applications can be unblocked.

In an embodiment, mobile device inhibitor system 304 can compare the phone number associated with the incoming and outgoing calls to a list of emergency phone numbers to determine whether the incoming or outgoing phone call is an emergency call. In other embodiments, metadata associated with the phone call or the data packets can indicate whether the network operations are emergency related or otherwise approved network operations.

Figure 4:
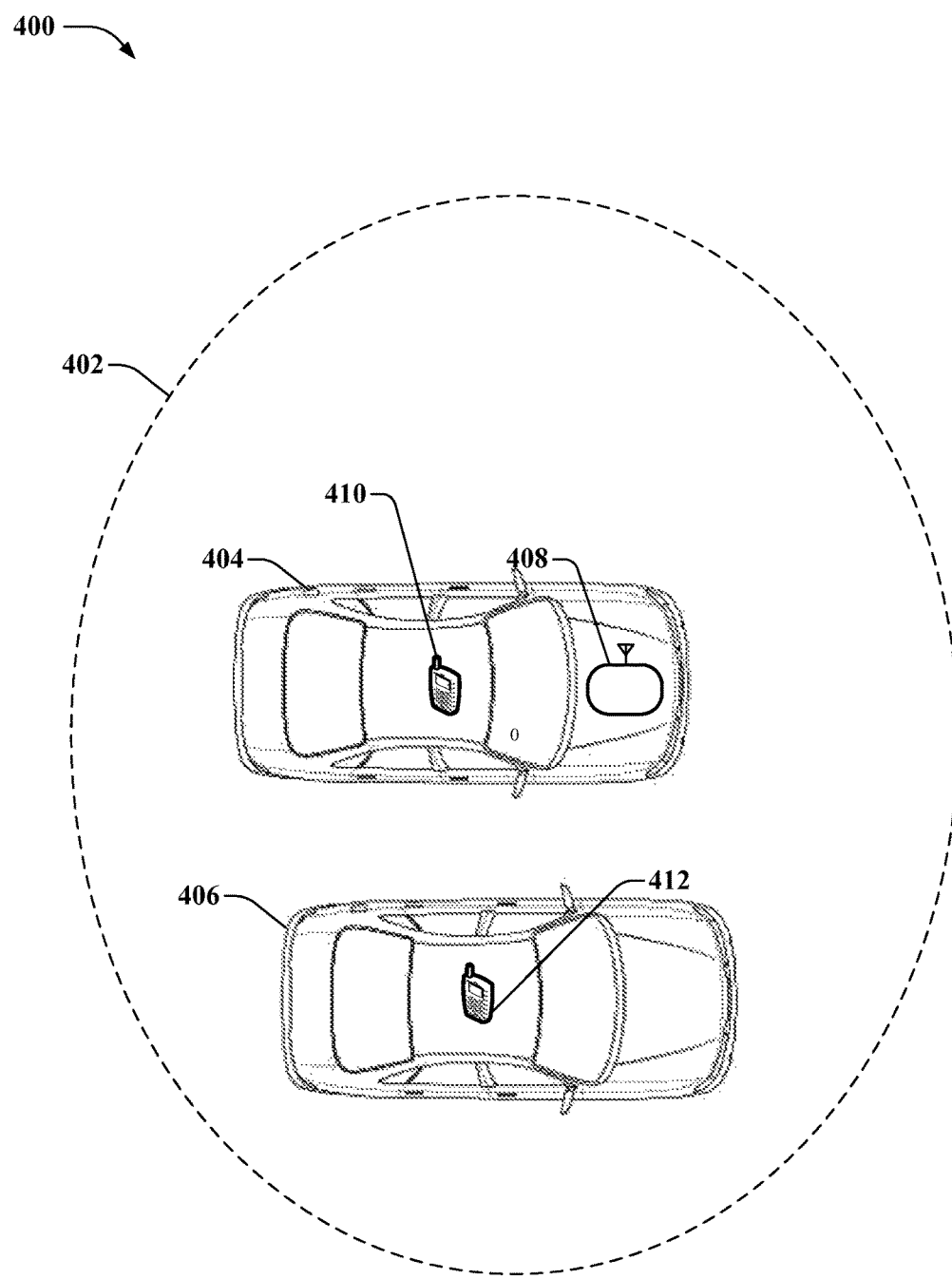
FIG. 4 is an example, non-limiting embodiment of a block diagram showing a mobile device inhibitor system that determines which mobile device to block in accordance with various aspects described herein.

Turning now to FIG. 4, illustrated is an example, non-limiting embodiment of a block diagram 400 showing a mobile device inhibitor system 408 that determines which mobile device to block. The range 402 of femtocell coverage of a mobile device inhibitor system 408 in vehicle 404 can extend to vehicles (e.g., vehicle 406) passing by within range of mobile device inhibitor system 408. Since it would be undesirable to block network operations of mobile devices (e.g., mobile device 412) in vehicle 406, when passing within range 402, mobile device inhibitor system 408 can selectively inhibit the network operations of mobile device 410 and other mobile devices in vehicle 404 without inhibiting the network operations of mobile device 412 that is just passing by.

In an embodiment, mobile device inhibitor system 408 can selectively inhibit the network operations of mobile device 410 based on the ID of the mobile device 410. Mobile device inhibitor system 408 can determine the International Mobile Equipment Identity (IMEI) number, Electronic Serial Number (ESN), Mobile Equipment Identifier (MEID), or phone number, and compare the numbers to a database of identifiers that have been selected for blocking.

In other embodiments, mobile device inhibitor system 408 can adaptively block mobile devices by learning which mobile devices are associated with vehicle 404. Mobile device inhibitor system 408 can track the amount of time that mobile device 410 is within range 402 of the mobile device inhibitor system 408, and once the time passes a predetermined minimum amount of time, the mobile device 410 can be blocked or otherwise inhibited. In other embodiments, mobile device inhibitor system 408 can track the network operations of the mobile device 410, and can block the mobile device 410 based on the types and duration of the network operations. If network operations on mobile device 410 are being used for navigation, mobile device 410 may be allowed to continue, but if phone calls, text messages, or other unapproved data usage is being performed, then the mobile device 410 can be selected for blocking. In other embodiments, occasional phone calls, text messages or other data usage may be allowed, but once network operations exceed a predetermined minimum duration, network operations can be blocked on mobile device 410.

Turning now to FIG. 5, illustrated is an example, non-limiting embodiment of a block diagram showing a mobile device inhibitor system 500. Call device inhibitor 502 can be configured to inhibit or otherwise block calls, text messages, and data usage on mobile device 512 when a vehicle (e.g., vehicle 102, 202, etc) associated with the call inhibitor device 502 is moving.

In an embodiment, the call inhibitor device 502 can include a femtocell component 504 that can be configured to determine that mobile device 512 is within range of the femtocell component 504. If the mobile device 512 is within range, femtocell component 504 can reroute communications between the mobile device 512 and a cellular antenna through the femtocell component 504.

Once mobile device 512 has been selected for blocking, inhibitor controller 506 can also be configured for blocking or otherwise inhibiting the network operations on mobile device 512 based on an operational status of the vehicle. ECU component 510 can determine the vehicle associated with call inhibitor device 502 is moving based on data received from the vehicle's ECU port. The call inhibitor device 502 can be plugged into an ECU port, or other port on the vehicle (e.g., an onboard diagnostics port or other existing connection). The call inhibitor device 502 can also be connected wirelessly to the ECU. In still other embodiments, the call inhibitor device 502 can determine the vehicle is moving based on location component 508 (which can include a GPS system or accelerometers configured to detect vehicle movement) located in the call inhibitor device 502. In an embodiment, the network operations can then be unblocked when the vehicle is determined to come to a stop or when the engine is turned off.

In an embodiment, inhibitor controller 506 can inhibit and/or otherwise block network operations whenever the vehicle is being operated, regardless of whether the vehicle is moving. Thus, network operations would be inhibited while the vehicle is stopped at a traffic light. In other embodiments, inhibitor controller 506 can inhibit calls and data usage on mobile device 512 based on a speed of the vehicle. For instance, network operations on mobile device 512 can be blocked if the speed of the vehicle is over 5 mph or some other predetermined limit.

In an embodiment, normal operations and/or data usage on the mobile device 512 can be blocked and/or otherwise inhibited when the vehicle is moving, but when an outgoing call, incoming call, or data usage determined to be emergency related is made, the inhibitor controller 506 can allow the call to go through, or the data usage to continue. Examples of emergency calls can include 911 calls and calls to or from a dispatcher or other emergency service. Data usage connected with applications that are associated with emergency services can also be allowed to pass. In an embodiment, any phone calls to or from a white-listed number, or data usage associated with approved applications can be unblocked.

Figure 6:
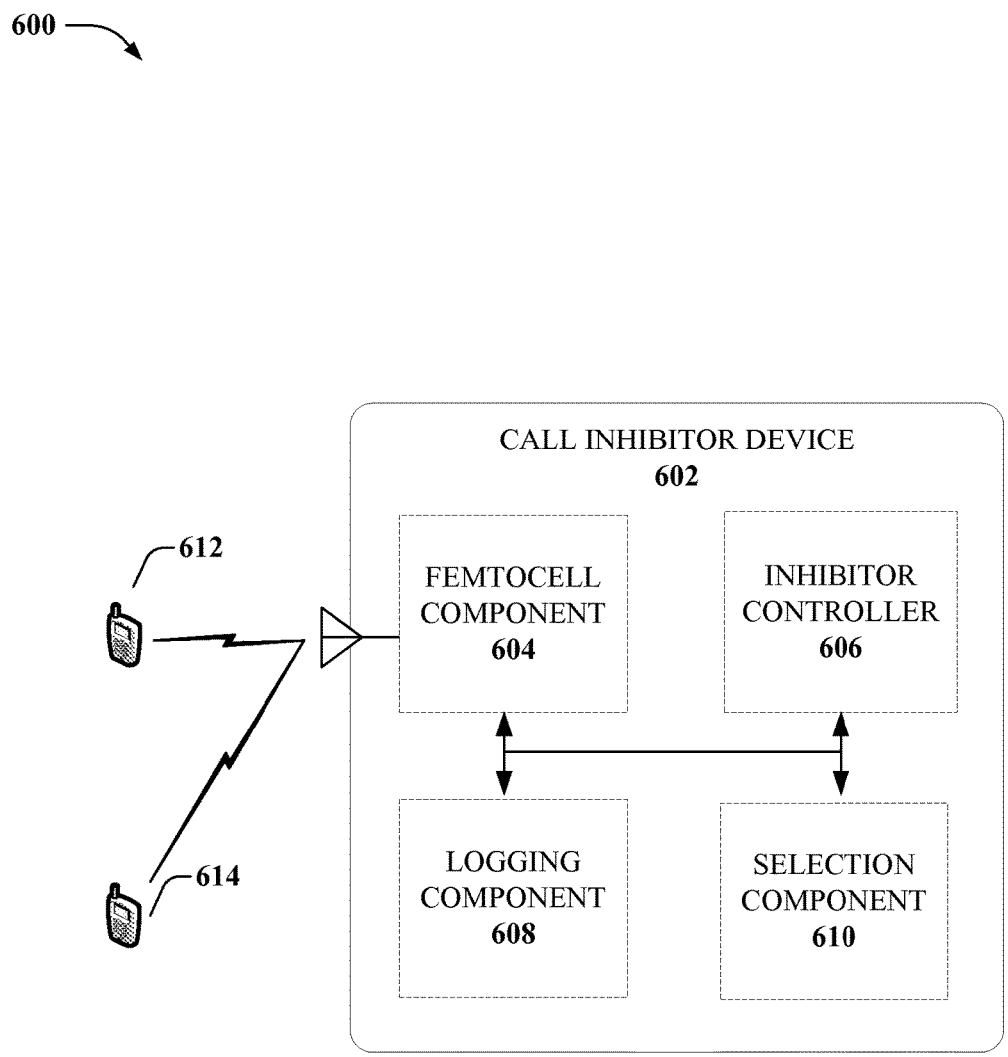
FIG. 6 is an example, non-limiting embodiment of a block diagram showing a mobile device inhibitor system that determines which mobile device to block in accordance with various aspects described herein.

Turning now to FIG. 6, illustrated is an example, non-limiting embodiment of a block diagram showing a mobile device inhibitor system 600 that determines which mobile device to block.

Call device inhibitor 602 can be configured to inhibit or otherwise block calls, text messages, and data usage on one or more of mobile devices 612 and 614 when a vehicle (e.g., vehicle 102, 202, etc) associated with the call inhibitor device 602 is moving.

In an embodiment, the call inhibitor device 602 can include a femtocell component 604 that can be configured to determine that mobile device 612 and/or 614 are within range of the femtocell component 604. Selection component 610 can then select whether mobile device 612 and/or 614 should be blocked. The selection component 610 can determine whether mobile devices 612 or 614 are to be selected for rerouting network operations via the femtocell component 604 based on the ID of the mobile devices. Selection component 610 can determine the IMEI number, ESN, MEID, or phone number, and compare the numbers to a database of identifiers that have been selected for blocking. Selection component 610 can also select one or more of mobile devices 612 and 614 for rerouting after determining whether mobile devices are associated with the vehicle. Logging component 608 can track the amount of time that mobile devices 612 and 614 are within range of the call inhibitor device 602, and once the time passes a predetermined minimum amount of time, one or more of mobile devices 612 and 614 can be selected for blocking. In other embodiments, logging component 608 can track the network operations of the mobile devices, and can select one or more of mobile devices 612 and 614 for blocking based on the types and duration of the network operations. If network operations are being used for navigation, those network operations may be allowed to continue, but if phone calls, text messages, or other unapproved data usage is being performed, then one or more of mobile devices 612 and 614 can be selected for blocking. In other embodiments, occasional phone calls, text messages or other data usage may be allowed, but once network operations exceed a predetermined minimum duration, network operations can be blocked.

Figure 7:
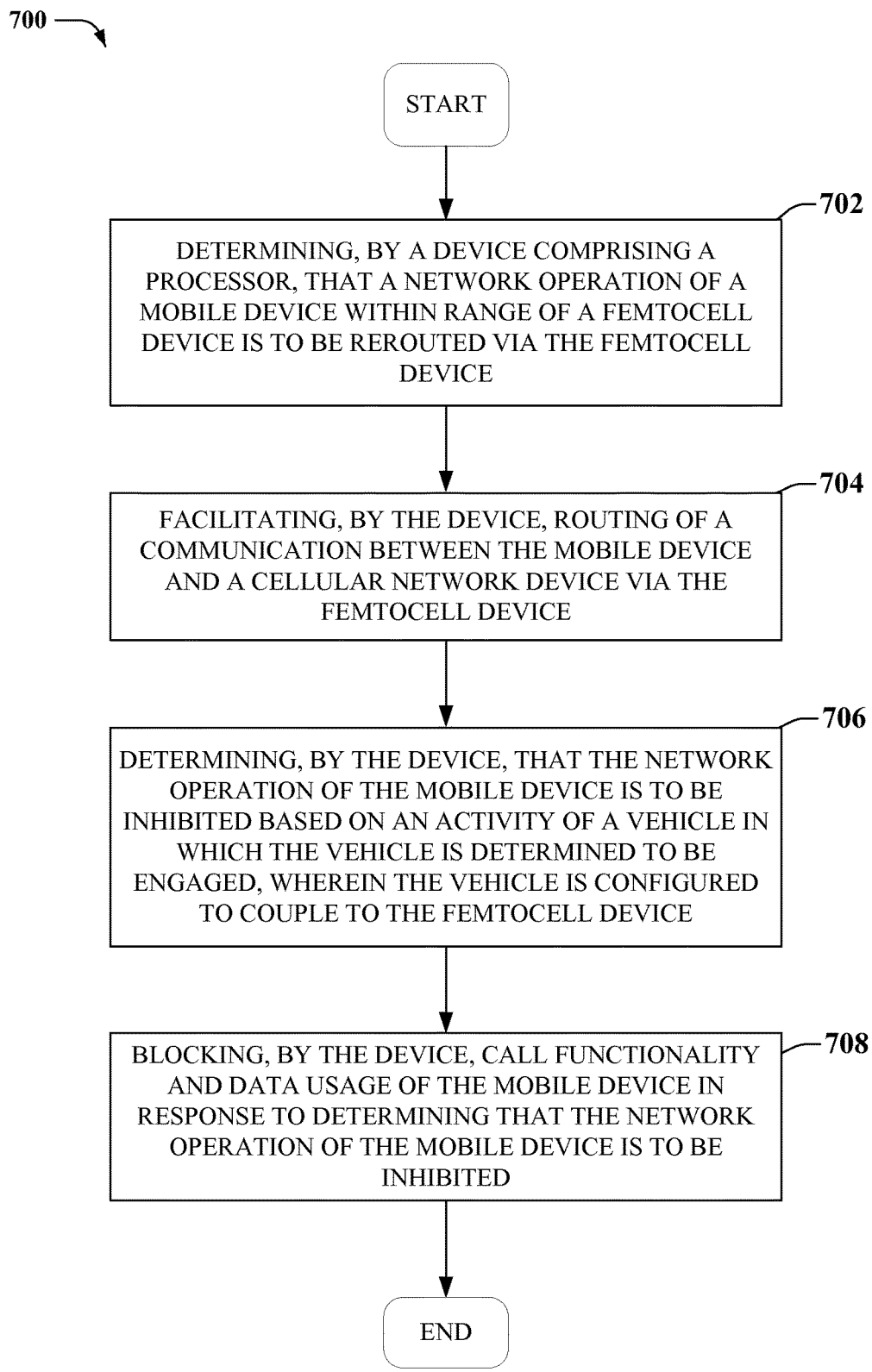
FIG. 7 illustrates a flow diagram of an example, non-limiting embodiment of a method for inhibiting a mobile device as described herein.

FIG. 7 illustrates a process in connection with the aforementioned systems. The process in FIG. 7 can be implemented for example by the systems in FIGS. 1-6. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates a flow diagram of an example, non-limiting embodiment of a method for inhibiting a mobile device. At 702, the method comprises that a network operation of a mobile device within range of a femtocell device is to be rerouted via the femtocell device (e.g., by inhibitor controller 506 and/or selection component 610). The mobile devices can be selected for rerouting network operations via the femtocell device based on the ID of the mobile devices. The IMEI number, ESN, MEID, or phone number of the mobile devices can be determined and compared to a database of identifiers that have been selected for blocking. One or more of mobile devices can be selected for rerouting after determining whether mobile devices are associated with the vehicle. The amount of time that mobile devices are within range of the femtocell device can also be tracked, and once the time passes a predetermined minimum amount of time, one or more of mobile devices can be selected for blocking.

At step 704, the communications between the mobile device and a cellular network device can be routed through the femtocell device (e.g., by femtocell components 504 or 604). At 706, it can be determined that the network operation of the mobile device is to be inhibited based on an activity of a vehicle in which the vehicle is determined to be engaged, wherein the vehicle is configured to couple to the femtocell device (e.g., by inhibitor controller 506). If the vehicle has a non-zero speed, or has a speed above a predetermined threshold, the network operations can be selected for blocking. Also, if the vehicle is turned on or has the engine running, the communications can selected blocking. At 708, the call functionality and data usage of the mobile device are blocked by the device in response to determining that the network operation of the mobile device is to be inhibited Referring now to FIG. 8, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

Figure 8:
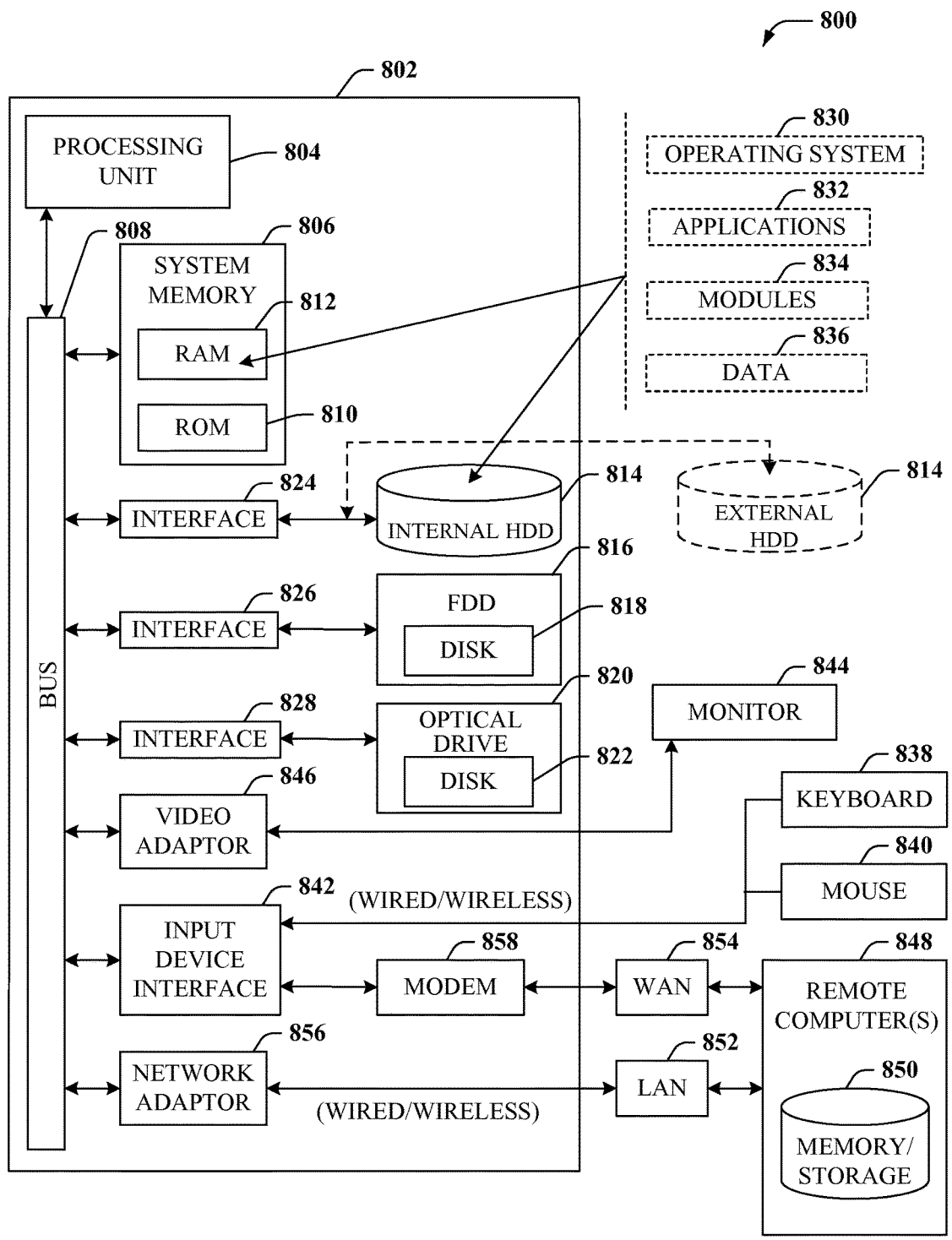
FIG. 8 is a block diagram of an example, non-limiting embodiment of a computing environment in accordance with various aspects described herein.

In order to provide additional context for various embodiments described herein, FIG. 8 and the following discussion are intended to provide a brief, general description of a suitable computing environment 800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), which internal hard disk drive 814 can also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and Institute of Electrical and Electronics Engineers (IEEE) 894 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

A user can enter commands and information into the computer 802 through one or more wired/wireless input devices, e.g., a keyboard 838 and a pointing device, such as a mouse 840. Other input devices (not shown) can include a microphone, an infrared (IR) remote control, a joystick, a game pad, a stylus pen, touch screen or the like. These and other input devices are often connected to the processing unit 804 through an input device interface 842 that can be coupled to the system bus 808, but can be connected by other interfaces, such as a parallel port, an IEEE 1394 serial port, a game port, a universal serial bus (USB) port, an IR interface, etc.

A monitor 844 or other type of display device can be also connected to the system bus 808 via an interface, such as a video adapter 846. In addition to the monitor 844, a computer typically includes other peripheral output devices (not shown), such as speakers, printers, etc.

The computer 802 can operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 852 through a wired and/or wireless communication network interface or adapter 856. The adapter 856 can facilitate wired or wireless communication to the LAN 852, which can also include a wireless AP disposed thereon for communicating with the wireless adapter 856.

When used in a WAN networking environment, the computer 802 can include a modem 858 or can be connected to a communications server on the WAN 854 or has other means for establishing communications over the WAN 854, such as by way of the Internet. The modem 858, which can be internal or external and a wired or wireless device, can be connected to the system bus 808 via the input device interface 842. In a networked environment, program modules depicted relative to the computer 802 or portions thereof, can be stored in the remote memory/storage device 850. It will be appreciated that the network connections shown are example and other means of establishing a communications link between the computers can be used.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 9:
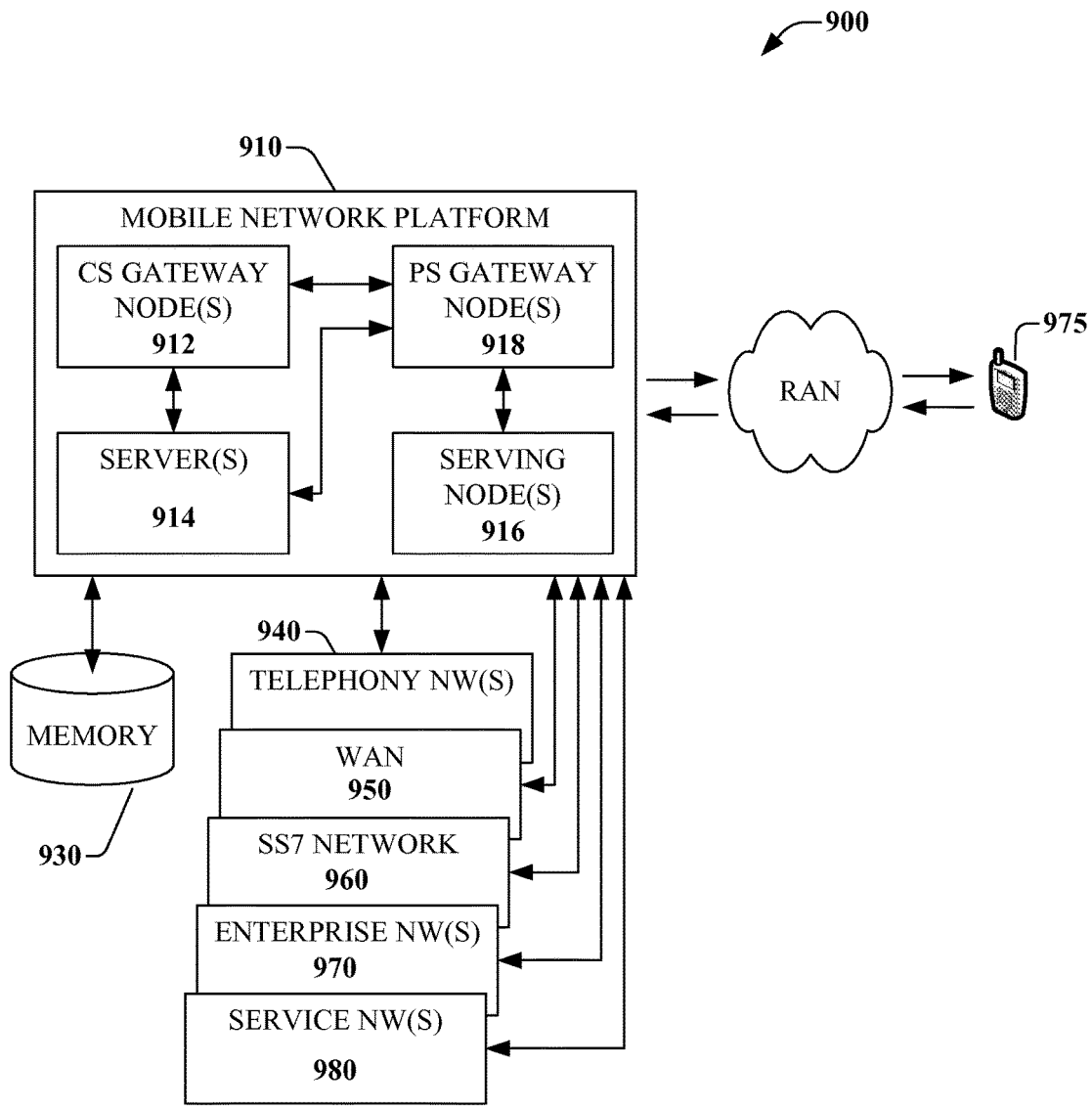
FIG. 9 is a block diagram of an example, non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
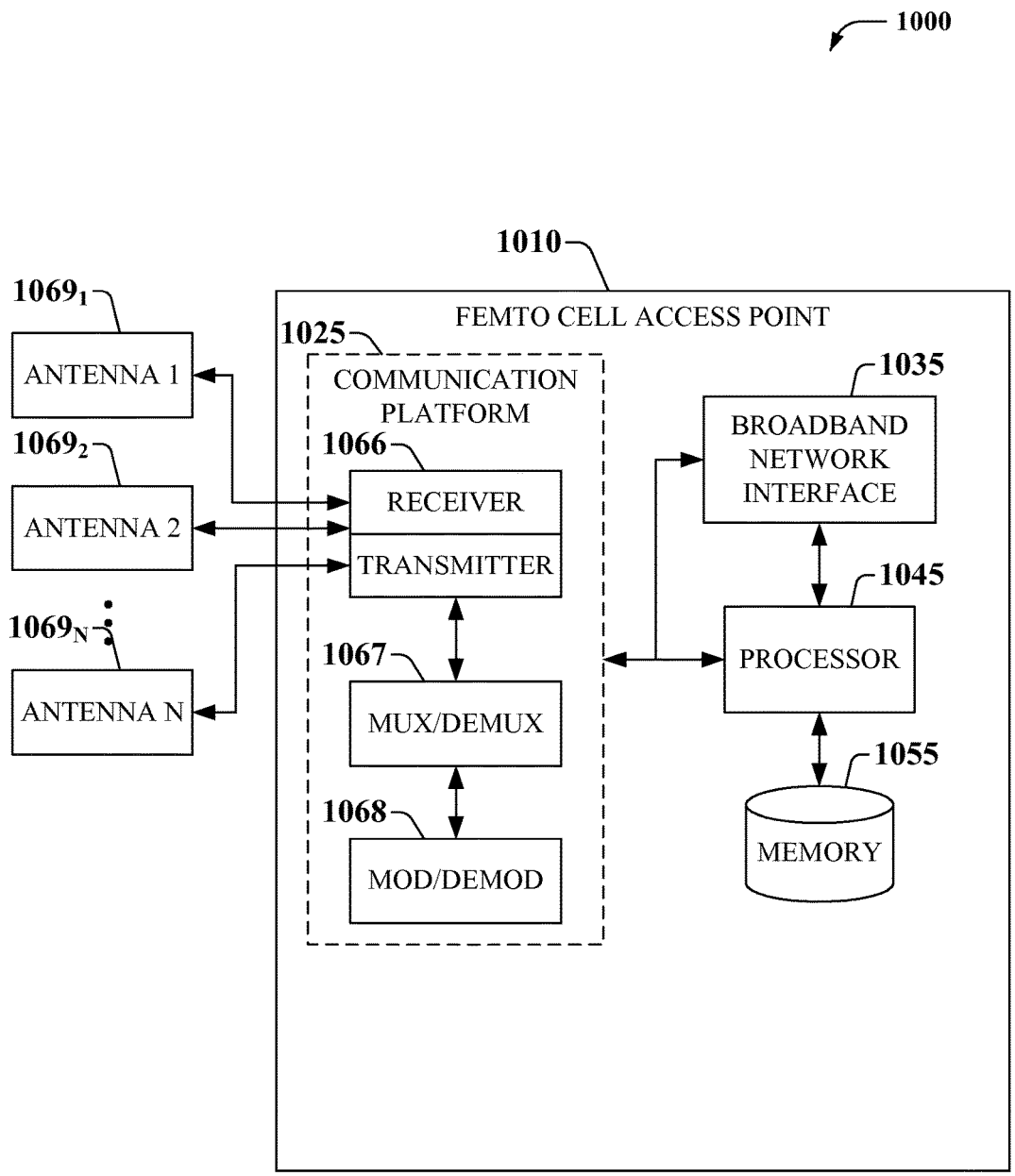
FIG. 10 is a block diagram of an example, non-limiting embodiment of a femtocell access point in accordance with various aspects described herein

With respect to FIG. 10, in example embodiment 1000, femtocell AP 1010 can receive and transmit signal(s) (e.g., traffic and control signals) from and to wireless devices, access terminals, wireless ports and routers, etc., through a set of antennas $1069_1$-$1069_N$. It should be appreciated that while antennas $1069_1$-$1069_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 includes a transmitter/receiver (e.g., a transceiver) 1066 that can convert signal(s) from analog format to digital format upon reception, and from digital format to analog format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1010 also includes a processor 1045 configured to confer functionality, at least partially, to substantially any electronic component in the femto access point 1010, in accordance with aspects of the subject disclosure. In particular, processor 1045 can facilitate FAP 1010 to implement configuration instructions received through communication platform 1025, which can include storing data in memory 1055. In addition, processor 1045 facilitates FAP 1010 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1045 can manipulate antennas $1069_1$-$1069_N$ to facilitate beamforming or selective radiation pattern formation, which can benefit specific locations (e.g., basement, home office . . . ) covered by FAP; and exploit substantially any other advantages associated with smart-antenna technology. Memory 1055 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1055 can store configuration information such as schedules and policies; FAP address(es) or geographical indicator(s); access lists (e.g., white lists); license(s) for utilization of add-features for FAP 1010, and so forth. In one example, data store 206 can be implemented in memory 1055.

In embodiment 1000, processor 1045 is coupled to the memory 1055 in order to store and retrieve information necessary to operate and/or confer functionality to communication platform 1025, broadband network interface 1035 (e.g., a broadband modem), and other operational components (e.g., multimode chipset(s), power supply sources, . . . , not shown) that support femto access point 1010.

In order to provide a context for the various aspects of the disclosed subject matter, FIGS. 8, 9, and 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining that a mobile device is within range of a femtocell device that is associated with a vehicle;
      initiating routing of a communication between the mobile device and a network device of a cellular network via the femtocell device; and
      inhibiting a network operation of the mobile device in response to determining that the network operation is to be blocked based on an operational status of the vehicle determined in response to receiving data, from an electronic control unit associated with the vehicle, regarding an ignition status of the vehicle and based on a defined time duration threshold having been exceeded in response to the network operation having been initially unblocked.

2. The system of claim 1, wherein the operations further comprise:
   determining that the mobile device is to be inhibited based on history data representative of an activity history of the mobile device.

3. The system of claim 2, wherein the operations further comprise:
   determining that an incoming or an outgoing call to or from the mobile device is to be inhibited based on the history data.

4. The system of claim 3, wherein the history data comprises first data representing call duration, second data representing a number of calls received or placed, and third data representing data usage of the mobile device.

5. The system of claim 1, wherein the operations further comprise:
   notwithstanding the inhibiting, enabling an outgoing call to be made in response to determining that the outgoing call is an emergency call.

6. The system of claim 1, wherein the operations further comprise:
   determining the operational status of the vehicle based on location information representing a location associated with the femtocell device.

7. The system of claim 1, wherein the operational status of the vehicle comprises information representing a speed of the vehicle.

8. The system of claim 7, wherein the inhibiting comprises inhibiting the network operation of the mobile device in response to the speed of the vehicle being determined to be non-zero.

9. The system of claim 1, wherein the electronic control unit is communicatively coupled to the system via a port associated with the electronic control unit.

10. A method, comprising:
    determining, by a device comprising a processor, that a network operation of a mobile device within range of a femtocell device is to be rerouted via the femtocell device;
    facilitating, by the device, routing of a communication between the mobile device and a cellular network device via the femtocell device;
    determining, by the device, that the network operation of the mobile device is to be inhibited based on an activity of a vehicle in which the vehicle is determined to be engaged and based on a defined period of time having expired during which the network operation was not initially inhibited, wherein the vehicle is configured to couple to the femtocell device and wherein the activity of the vehicle is based on engine data representing engine revolutions per minute received from an electronic control unit associated with the vehicle; and blocking, by the device, call functionality and data usage of the mobile device in response to determining that the network operation of the mobile device is to be inhibited.

11. The method of claim 10, further comprising:

allowing, by the device, an emergency call from the mobile device to connect.

12. The method of claim 10, wherein the determining that the network operation of the mobile device is to be inhibited is based on log data representative of a call log of the mobile device.

13. The method of claim 10, further comprising:

determining, by the device, that an incoming or an outgoing call to or from the mobile device, respectively, is to be inhibited based on a phone number associated with the incoming or outgoing call.

14. The method of claim 10, further comprising:

determining, by the device, the activity of the vehicle based on location information comprising a location associated with the femtocell device.

15. A femtocell device, comprising:

a processor; and a memory that stores executable instructions that, when executed by the processor, facilitate performance of operations, comprising:

routing a communication between a network device of a cellular network and a mobile device, wherein the femtocell device is associated with a vehicle; and determining that a network operation of the mobile device is to be blocked in response to determining that the vehicle is moving based on information received via an electronic control port associated with the vehicle and based on an elapse of time exceeding a defined threshold period of time during which the network operation has initially been unblocked, and the femtocell device receiving an indication to block the communications between the network device and the mobile device.

16. The femtocell device of claim 15, wherein the operations further comprise determining that the vehicle is moving.

17. The femtocell device of claim 15, wherein the operations further comprise allowing emergency calls to be made to the mobile device.

18. The femtocell device of claim 15, wherein the operations further comprise determining that the network operation of the mobile device is to be blocked based on a length of time that the mobile device is within range of the femtocell device.

19. The femtocell device of claim 15, wherein the operations further comprise facilitating broadcast of the information from the electronic control port and the information represents an ignition state of an engine associated with the vehicle.

20. The method of claim 10, further comprising facilitating, by the device, wireless transmission of the engine data from the electronic control unit.

* * * * *